June 10, 1958  T. HARRIS  2,838,066
METERING VALVE
Filed March 16, 1954
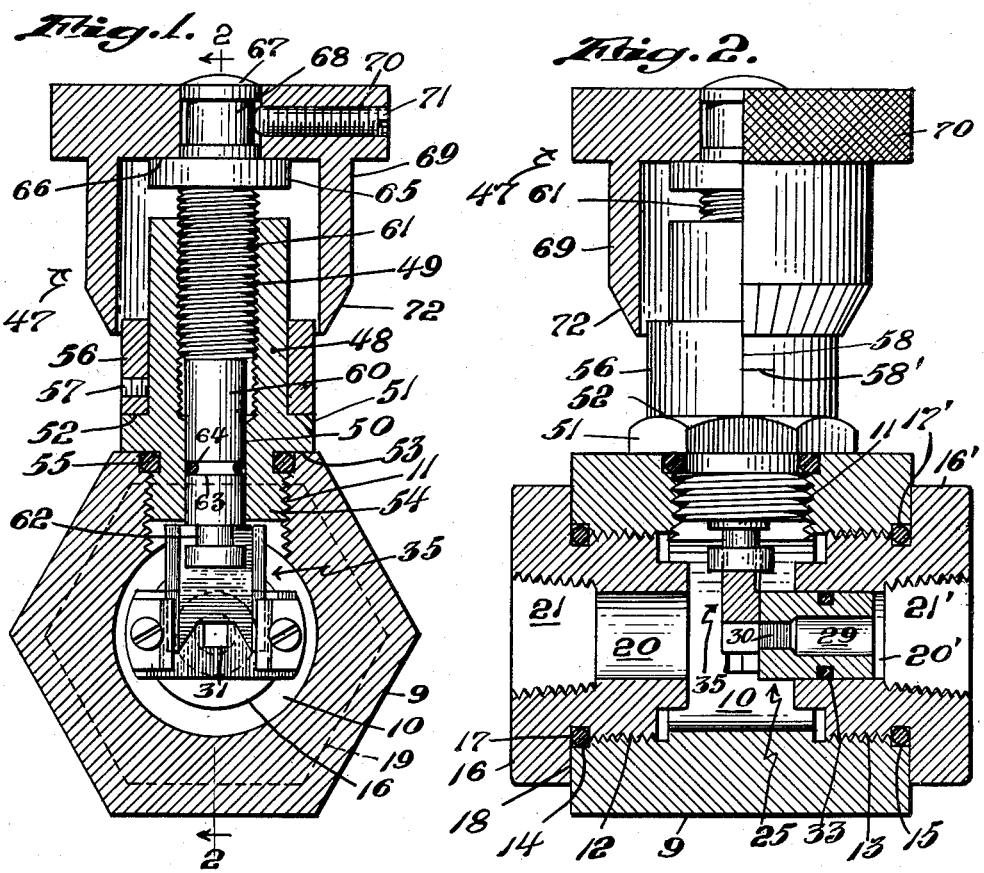
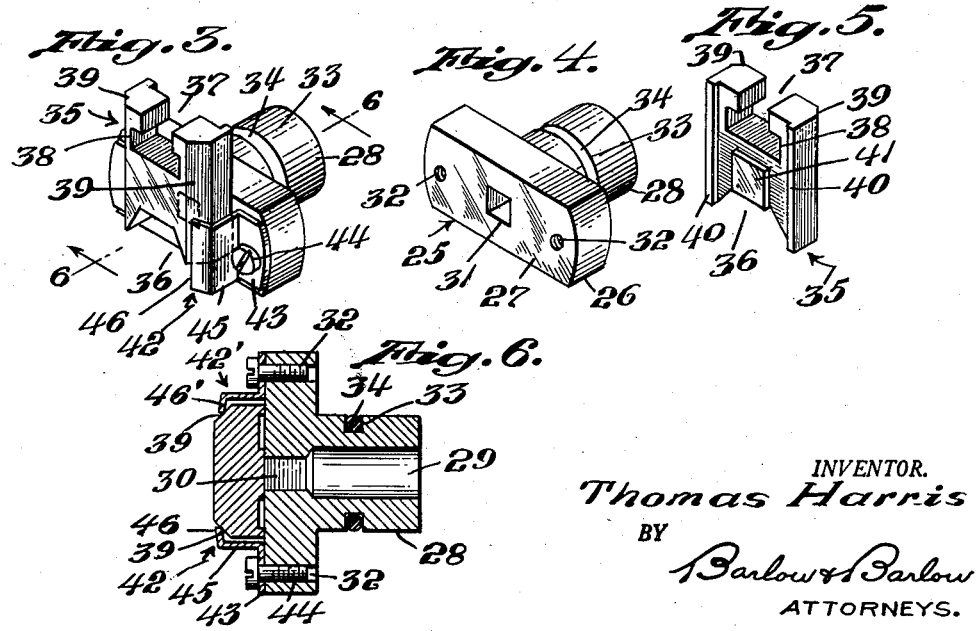
INVENTOR.
Thomas Harris
BY
Barlow & Barlow
ATTORNEYS.

United States Patent Office 2,838,066
Patented June 10, 1958

2,838,066
METERING VALVE

Thomas Harris, Warwick, R. I., assignor to Harris & Stevenson Engineering & Development Co., Inc., a corporation of Rhode Island Application March 16, 1954, Serial No. 416,513

1 Claim. (Cl. 137—556)

This invention relates to a metering valve.

An object of the invention is to provide a valve wherein the flow increase will be the same for each like distance of opening movement of the valve closure.

Another object is to provide a valve free of chatter.

Another object is to provide a valve which will be self-cleansing during operation.

Another object is to provide a valve which will be self-sealing under fluid pressure.

Another object is to provide a valve so constructed as to provide for the fluid pressure to act on the closure plug in a direction to move the sealing surfaces of the valve in contact against each other.

Another object is to provide precision micrometer operating means for moving the valve to open or closed position.

A more specific object is to provide a valve so constructed that the sealing surfaces will be maintained in good sealing condition under constant use.

With these and other objects in view, the invention consists of certain novel features of construction as will be more fully described and particularly pointed out in the appended claim.

In the accompanying drawings:

Figure 1 is a central sectional view of a valve embodying my invention looking endwise at the valve and illustrating the same as being in the fully open position thereof;

Figure 2 is a side elevational view partially in section and as taken substantially along line 2—2 of Figure 1;

Figure 3 is a perspective view of the valve seat and closure member in assembled relation;

Figure 4 is a perspective view of the valve seat;

Figure 5 is a perspective view of the closure member; and

Figure 6 is a sectional view taken substantially centrally through the assembly of Figure 3 and looking in the direction of the arrows on line 6—6 of Figure 3.

The valve according to the invention (see Figures 1 and 2) comprises a body 9 of generally hexagonal shape having an axial bore 10 therethrough which is intersected substantially midway thereof by a radial threaded bore 11. The bore 10 is screw threaded as at 12 and 13 at each end portion and enlarged at the end extremity to form similar recesses 14, 15 which extend inwardly from each end of the body 9. A screw threaded flanged cap 16 is engaged with the threaded bore 12 and a packing O-ring 17 is positioned within the recess 14 to be engaged by the flange 18 so as to prevent escape of fluid past the said body and cap 16. The periphery of the flange 18 may be made hexagonal in shape as at 19 (see Figure 1) to provide for the application of a wrench for tightening the cap in place. The cap 16 has an axial bore 20 therethrough which is enlarged on a taper as at 21 and screw threads are formed in the walls of this tapered bore portion 21 so as to receive a connecting pipe fitting and the like (not shown). Thus, there is formed an inlet opening in line with the bore or passage 10 through the valve. The other end of the passage 10 is provided with a screw cap 16' which forms an outlet for the passage 10. The cap 16' is substantially identical in construction to the cap 16, and similar portions thereof are indicated with similar but primed numerals. A packing O-ring 17' seals the passage 11 against leakage past the said cap 16'.

A valve seat designated generally 25 (see Figure 4) has a generally rectangular body 26 which is provided with a flat side 27 and a cylindrical shank 28. The side 27 is machined to a very smooth flat surface by means of a lapping operation. An axial bore 29 (see Figures 2 and 6) is formed through the valve seat 25. The portion 30 of the bore 29 which extends inwardly from the side 27 is made square in cross section, and the edges thereof at the side 27 form a valve seat 31. Screw threaded openings 32 extend inwardly at opposite sides of the seat 31, and an annular groove 33 is formed in the periphery of the shank 28 to receive a packing ring 34. The seating 25 is positioned in place in the passage 11 by inserting the shank 28 into bore 20' which is of a diameter to provide for a snug frictional engagement with the said shank, the O-ring 34 sealing the bore 20' against leakage past the shank 28.

The flow through the valve passes through the square bore 30. According to the invention the flow past the valve seat 31 is controlled by means of a closure plug designated generally 35 (see particularly Figures 3 and 5). This plug 35 comprises a generally rectangular block having a V recess 36 extending inwardly from the bottom side thereof and slot 37 extending inwardly from the top side thereof, the slot 37 being undercut as at 38 to form an inverted T slot. The side edges are beveled at the front portion thereof as at 39. The rear side of the block is recessed to form ways 40 and a raised central rectangular pad 41 which is made square and slightly larger than the dimension of the valve seat 31 so as to slightly overlap the edges of the valve seat when the plug is in the closed position. The ways 40 and pad 41 are in the same plane, and these are machined to a flat smooth surface as by means of a lapping operation.

A slide guide 42 is mounted on the side 27 of the body 26 at one side of the valve seat 31. The guide is made of resilient relatively thin sheet material and has a foot portion 43 which engages the side 27 and is apertured to receive a cap screw 44 which screw threads into opening 32 to firmly attach the slide in position. The slide has a right angularly extending wall 45, the outer end portion of which is bent inwardly to form a lip 46. A similar guide slide 42' is similarly mounted on the opposite side of the valve seat 31 with the lip portions 46, 46' thereof extending towards each other. The plug 35 is slidably received between the guides 42 with the T slot 37 in uppermost position and the ways 40 in contact with the side 27. The sides of plug 35 are spaced from the walls 45, and the lips 46, 46' extend into engagement with the bevel edge portions 39 of the said plug. The lips 46, 46' are sprung slightly outwardly by contact with the said bevel edges, which places a tension on the plug tending to move the ways 40 and pad 41 normally in firm contact with the side 27. Referring to Figure 6 it will be seen that the rear surface of the closure about the pad 41 and extending between the ways 40 is exposed to fluid pressure. This area partially balances an opposite larger area on the front side of the closure plug. Thus, there is a tendency to move the said closure into sealing engagement with the valve seat 31.

The closure plug 35 is slidably moved to and from closed position by a micrometer head like construction designated generally 47. One part of this head comprises a sleeve 48 having a screw threaded bore 49, a smooth bore portion 50 of slightly less diameter with a radial flange 51 which forms a shoulder 52 on one side and a second shoulder 53 on the other side. The inner end portion 54 of the body sleeve is screw threaded into the bore 11 of the body. The shoulder 53 is engaged with the adjacent side of the body 9 and a sealing O-ring 55 is positioned between the flange 51 and the body 9, the upper portion of the bore 11 being recessed to receive the said O-ring 55. The flange 51 has a hexagonal-shaped periphery (see Figure 2) for receiving a wrench and the like tool so as to tighten the sleeve in place. A second sleeve 56 is snugly received on the sleeve 48 to be engaged against the shoulder 52 and is held in position by a set screw 57. This sleeve 56 has a datum line 58 thereon.

Another part of said head comprises a spindle 60 which is provided with a threaded shank 61 which is screw threaded in the bore portion 49 and extends through the bore 50 to project therebeyond. The inner end portion of the spindle is necked as at 62 to engage in the slot portion 37 with the extreme inner end portion of the spindle engaged with the undercut slot portion 38. A recess 63 is made in the spindle 60 to receive a packing O-ring 64 to block passage of fluid past the spindle and adjacent wall of the bore 50. The upper end of the spindle 60 has a flange 65 which forms a shoulder 66 spaced from the end of the spindle and provides the outer projecting portion 67 of the spindle. This portion 67 has an annular groove 68 formed therein. A thimble 69 having a knurled flange 70 is received on the spindle portion 67 and rests against the shoulder 66 and is secured to the spindle by means of a set screw 71 which screw threads through flange 70 to engage in the annular recess 68. The thimble 69 surrounds the sleeve 56 and its lower end portion is tapered as at 72 to provide a bevel surface which may be graduated in equal increments, which with the datum line 58, 58' may indicate the amount of the opening of the closure plug 35. It will be quite apparent that turning the thimble in one or the other directions will move the plug 35 to or from the valve seat.

Referring to Figures 1 and 2, it will be seen that when the lower edge of the pad 41 is in register with the upper edge of the valve seat 31, a full flow through the valve seat is had. Assume it is desired that one complete turn of the thimble 69 completely close the valve seat, then the lead of the screw threads 61 is chosen to travel the spindle the distance of the vertical height of the opening 30, then the beveled edge of the thimble may be graduated in increments to indicate the flow or amount of valve opening at any position of the thimble relative to the datum lines 58, the datum line 58' indicating the fully closed position of the valve. It will also be apparent that each equal amount of turning of the thimble will increase or decrease the flow in like amounts. Thus, it becomes readily simple to graduate the thimble to indicate any desired ratio of opening of the plug for each divisional turn of the thimble.

Since the plug 35 is recessed on the rear side thereof, the plug is balanced in a controlled manner for the pressure acting thereon in a direction tending to move the ways 40 and pad 41 in sealing engagement with the finished surface of side 27, the greater the pressure of the liquid, the more pressure at the contact between sealing surfaces. Further, the opening and closing of the plug has a healing action to maintain the seat 31 cleansed and also has a lapping action to maintain and improve the good sealing contact between sealing surfaces.

I claim:

A metering valve comprising a valve body having a hollow area therein, inlet and outlet openings therefrom more restricted in cross-section than said area and providing a flow passageway through said body, a valve seat having a seating surface in a single plane in said passageway having an opening leading from the influent side of said passageway to the effluent side thereof, L-shaped guides carried by said seating surface on either side of said opening and spaced therefrom, each having with one leg of the L spaced from and parallel to said seating surface to provide a guide channel, a closure plug slidable in said guide channels and having surface portions in a single plane engaging said seating surface two of said surface portions being in said guide channels a third surface portion of approximately the size of said opening being between said guides and located to be moveable across said opening for controlling the flow of fluid through said opening with the remainder of said plug being spaced from said seat, said closure plug having an inverted T-slot, a spindle rotatably mounted for axial movement thereof towards and from said opening and having a reduced neck portion providing a head located in said slot for attaching said closure plug to said spindle for movement therewith axially of the spindle and for movement relative to the spindle in a direction normal to the seating surface.

References Cited in the file of this patent

UNITED STATES PATENTS

| | | |
|---|---|---|
| 868,863 | Huntoon | Oct. 22, 1907 |
| 871,085 | Claflin | Nov. 12, 1907 |
| 879,751 | Dornfeld | Feb. 18, 1908 |
| 966,150 | Woodbridge | Aug. 2, 1910 |
| 999,457 | Kellar | Aug. 1, 1911 |
| 1,280,451 | Hagen | Oct. 1, 1918 |
| 1,780,471 | Galloway | Nov. 4, 1930 |
| 2,000,352 | Pease | May 7, 1935 |
| 2,091,618 | Szabo | Aug. 31, 1937 |
| 2,596,817 | McGovney | May 13, 1952 |
| 2,674,436 | Jones | Apr. 6, 1954 |

FOREIGN PATENTS

| | | |
|---|---|---|
| 515,829 | Germany | of 1931 |
| 806,363 | France | of 1936 |
| 834,291 | France | of 1938 |
| 206,659 | Switzerland | of 1939 |